(12) United States Patent
Kelnhofer et al.

(10) Patent No.: US 9,592,916 B2
(45) Date of Patent: Mar. 14, 2017

(54) AIRCRAFT AIR CONDITIONING SYSTEM AND METHOD FOR CONTROLLING AN AIRCRAFT AIR CONDITIONING SYSTEM USING A BYPASS VALVE

(71) Applicant: AIRBUS OPERATIONS GMBH, Hamburg (DE)

(72) Inventors: Jürgen Kelnhofer, Hamburg (DE); Dariusz Krakowski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 463 days.

(21) Appl. No.: 13/847,337

(22) Filed: Mar. 19, 2013

(65) Prior Publication Data

US 2013/0248164 A1    Sep. 26, 2013

Related U.S. Application Data

(60) Provisional application No. 61/613,506, filed on Mar. 21, 2012.

(30) Foreign Application Priority Data

Mar. 21, 2012    (EP) .................... 12002004

(51) Int. Cl.
*B60H 1/00* (2006.01)
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0611* (2013.01);
(Continued)

(58) Field of Classification Search
CPC  B64D 13/08; B64D 13/06; B64D 2013/0655; B64D 2013/0688; B64D 2013/0611; F28B 9/00; Y02T 50/56
(Continued)

(56) References Cited

U.S. PATENT DOCUMENTS

| 2,937,011 A | * | 5/1960 | Brahm | .......................... 165/203 |
| 2003/0005718 A1 | * | 1/2003 | Mitani | ................... B64D 13/06 62/402 |

(Continued)

FOREIGN PATENT DOCUMENTS

| DE | 10 2008 053 320 | 5/2010 |
| DE | 10 2010 054 448 | 6/2012 |

OTHER PUBLICATIONS

Chinese Office Action dated Feb. 6, 2016.
Chinese Office Action dated Aug. 23, 2016.

*Primary Examiner* — Len Tran
*Assistant Examiner* — Gordon Jones
(74) *Attorney, Agent, or Firm* — Dickinson Wright PLLC (57) ABSTRACT

In a method for controlling an aircraft air conditioning system, a heating or cooling demand of an aircraft region to be air conditioned is determined. A volume flow of recirculation air discharged from the aircraft region to be air conditioned and a volume flow of compressed air into a mixing chamber of the aircraft air conditioning system is controlled such that the heating or cooling demand of the aircraft region to be air conditioned is met, while the volume flow of compressed air into the mixing chamber of the aircraft air conditioning system is minimized.

9 Claims, 6 Drawing Sheets (52) U.S. Cl.
    CPC ............... *B64D 2013/0655* (2013.01); *B64D 2013/0688* (2013.01); *Y02T 50/56* (2013.01)

(58) Field of Classification Search
    USPC ........................... 236/12.1, 49.3, 13; 62/186
    See application file for complete search history.

(56) References Cited

U.S. PATENT DOCUMENTS

| | | | |
|---|---|---|---|
| 2006/0070387 A1* | 4/2006 | Yamaguchi et al. | 62/186 |
| 2007/0130970 A1* | 6/2007 | Schwan et al. | 62/180 |
| 2007/0271952 A1* | 11/2007 | Lui et al. | 62/402 |
| 2008/0032616 A1* | 2/2008 | Vogel | 454/74 |
| 2008/0283663 A1* | 11/2008 | Space et al. | 244/118.5 |
| 2010/0101251 A1 | 4/2010 | Kelnhofer | |
| 2010/0240290 A1* | 9/2010 | Markwart et al. | 454/71 |

\* cited by examiner

AIRCRAFT AIR CONDITIONING SYSTEM AND METHOD FOR CONTROLLING AN AIRCRAFT AIR CONDITIONING SYSTEM USING A BYPASS VALVE

CROSS REFERENCE TO RELATED APPLICATIONS

This application is entitled to and claims the benefit of European Application No. EP 12 002 004.5 filed Mar. 21, 2012 and U.S. Provisional Application No. 61/613,506, filed Mar. 21, 2012, the disclosures of which, including the specification, claims, drawings and abstract, are incorporated herein by reference in their entirety.

FIELD

The present invention relates to a method for controlling an aircraft air conditioning system and to an aircraft air conditioning system.

BACKGROUND

So-called air-based air conditioning systems, as described for example in DE 10 2008 053 320 A1 or non-published DE 10 2010 054 448, are usually used at present in commercial aircraft to air-condition the aircraft cabin. An aircraft air conditioning system serves to cool the aircraft cabin, which would otherwise be overheated due to thermal loads, such as, for example, body heat of the passengers and waste heat from equipment present on board the aircraft. The aircraft air conditioning system in addition adequately supplies fresh air into the aircraft cabin to ensure that a prescribed minimum proportion of oxygen is present in the aircraft cabin.

Air-based air conditioning systems typically comprise an air conditioning unit, which is arranged, for example, in a wing root of the aircraft, and which is supplied with compressed process air that is generated by a compressor or bled of from an engine or an auxiliary power unit (APU) of the aircraft. During flight operation of the aircraft, usually engine bleed air is used so as to supply the air conditioning unit of the aircraft air conditioning system with compressed process air. During ground operation of the aircraft the air conditioning unit of the aircraft air conditioning system, however, typically is supplied with compressed process air from the auxiliary power unit of the aircraft. In the air conditioning unit, the process air, upon flowing through at least one heat exchanger as well as through various compression and expansion units, is cooled and expanded. Cooled process air exiting the air conditioning unit finally is supplied to a mixing chamber where it is mixed with recirculation recirculated from an aircraft region to be air conditioned. The mixed air from the mixing chamber, via respective mixed air lines, is supplied to the aircraft region to be air conditioned which may be divided into a plurality of air conditioning zones.

SUMMARY

The invention is directed at the object of specifying a method for controlling an aircraft air conditioning system, that allows a source of compressed process air to be supplied to the aircraft air conditioning system, such as for example an auxiliary power unit, to be operated in an energy-efficient manner. Further, the invention is directed at the object of providing an aircraft air condition system, that allows a source of compressed process air to be supplied to the aircraft air conditioning system, such as for example an auxiliary power unit, to be operated in an energy-efficient manner.

This object is achieved by a method for controlling an aircraft air conditioning system having features of claims herein and an aircraft air conditioning system having features of claims herein.

In a method, according to the invention, for controlling an aircraft air conditioning system, in a first step, a heating demand or a cooling demand of an aircraft region to be air conditioned is detected. The aircraft region to be air conditioned may be an aircraft passenger cabin, a cockpit, a freight compartment or any other aircraft region. The heating or cooling demand of the aircraft region to be air conditioned may, for example, be detected on the basis of a comparison of a set temperature in the aircraft region to be air conditioned with an actual temperature in the aircraft region to be air conditioned, wherein the actual temperature in the aircraft region to be air conditioned may, for example, be measured by a suitable temperature sensor. The set temperature in the aircraft region to be air conditioned may, for example, be determined by a user and entered via a suitable user interface of the air conditioning system or may be a temperature value which is stored in a control unit, preferably an electronic control unit for controlling the operation of the aircraft air conditioning system. The control unit for controlling the operation of the aircraft air conditioning system may also be used for determining the heating or cooling demand of the aircraft region to be air conditioned.

Further, in the method for controlling an aircraft air conditioning system, a volume flow of recirculation air discharged from the aircraft region to be air conditioned and a volume flow of compressed air into a mixing chamber of the aircraft air conditioning system is controlled such that the heating or cooling demand of the aircraft region to be air conditioned is met, while the volume flow of compressed air into the mixing chamber of the aircraft air conditioning system is minimized. In the method for controlling an aircraft air conditioning system the volume flow of recirculation air thus, beside the volume flow of compressed air into the mixing chamber of the aircraft air conditioning system, is used as a direct control parameter for controlling the operation of the aircraft air conditioning system in dependence on the heating or cooling demand of the aircraft region to be air conditioned. This allows the implementation of a control strategy aiming at a minimization of the volume flow of compressed air into the mixing chamber of the aircraft air conditioning system.

The compressed air may be provided by a compressed air source, such as for example a compressor, an engine or an auxiliary power unit of the aircraft. The compressed air provided by the compressed air source may be cooled and expanded in an air conditioning unit of the aircraft air conditioning system. The air cooled by the air conditioning unit, for appropriately adjusting the temperature of the air which is finally supplied to the mixing chamber, in an exit region of the air conditioning unit may be mixed with additional compressed hot air supplied from the compressed air source. "Compressed air" in the context of the present application thus may contain compressed air from a compressed air source which is cooled and expanded in an air conditioning unit and/or hot compressed air which is directly bled off the compressed air source.

By minimizing the use of compressed air during operation of the aircraft air conditioning system, the performance requirements placed on the compressed air source can be reduced. Specifically, the method for controlling an aircraft air conditioning system allows a particularly energy efficient operation of the compressed air source. Further, in particular if an engine or an auxiliary power unit of the aircraft is used as the compressed air source, fuel consumption and wear of the engine or the auxiliary power unit can be reduced.

If a heating demand of the aircraft region to be air conditioned is determined and the volume flow of compressed air exceeds a predetermined minimum value, a volume flow of recirculation air discharged from the aircraft region to be air conditioned into the mixing chamber may be increased. In case the aircraft region to be air conditioned should be heated, a set temperature of the mixed air in the mixing chamber typically is relatively high and may, for example, be between approximately 15 to approximately 70° C. By increasing the volume flow of typically relatively warm recirculation air into the mixing chamber the actual temperature of the mixed air in the mixing chamber may be increased so as to approach the set temperature. The volume flow of recirculation air from the aircraft region to be air conditioned into the mixing chamber may be increased, for example, by increasing the speed of recirculation fans conveying the recirculation air from the aircraft region to be air conditioned into the mixing chamber.

The volume flow of compressed air into the mixing chamber then is decreased in dependence on the increase of the volume flow of recirculation air into the mixing chamber. Preferably, the volume flow of recirculation air discharged from the aircraft region to be air conditioned into the mixing chamber is increased and the volume flow of compressed air into the mixing chamber is decreased until it has reached the predetermined minimum value allowing a particularly energy efficient operation of the compressed air source. The decrease of the volume flow of compressed air into the mixing chamber may be adjusted to the increase of the volume flow of recirculation air into the mixing chamber such that a combined volume flow of recirculation air and compressed air is kept constant.

As discussed above, the control strategy of increasing the recirculation air volume flow and correspondingly decreasing the compressed air volume flow into the mixing chamber is implemented only if the volume flow of compressed air into the mixing chamber still has not reached the predetermined minimum value. The volume flow of compressed air into the mixing chamber preferably corresponds to the predetermined minimum value, when an air conditioning unit of the aircraft air conditioning system is operated with its maximum cooling capacity, i.e., cools the compressed air to the lowest possible temperature, and a supply of hot compressed air to the air cooled by the air conditioning unit is interrupted.

Upon decreasing the volume flow of compressed air into the mixing chamber it is possible to first decrease the volume flow of air cooled by the air conditioning unit and to then decrease the supply of hot compressed air to the air cooled by the air conditioning unit in dependence on the decrease of the volume flow of air cooled by the air conditioning unit. It is, however also conceivable to implement a decrease of the volume flow of compressed air into the mixing chamber by first decreasing the supply of hot compressed air to the air cooled by the air conditioning unit and by then decreasing the volume flow of air cooled by the air conditioning unit in dependence on the decrease of the supply of hot compressed air to the air cooled by the air conditioning unit.

The supply of hot compressed air to the air cooled by the air conditioning unit may be decreased and finally interrupted by closing a bypass valve provided in a bypass line being connected to the compressed air source and opening into a line connecting the air conditioning unit to the mixing chamber downstream of the air conditioning unit. The bypass valve may be a valve having a variable flow cross section. When the bypass valve is fully closed, the supply of hot compressed air to the air cooled by the air conditioning unit is interrupted.

Preferably, after the volume flow of compressed air into the mixing chamber has reached the predetermined minimum value, the increase of the volume flow of recirculation air into the mixing chamber is stopped, as soon as an actual temperature of the mixed air in the mixing chamber corresponds to a set temperature of the mixed air in the mixing chamber. The set temperature of the mixed air in the mixing chamber may be associated with the heating demand of the aircraft region to be air conditioned.

The volume flow of compressed air into the mixing chamber may be increased from the predetermined minimum value, if it is determined that an actual temperature of the mixed air in the mixing chamber is below a set temperature of the mixed air in the mixing chamber, although the volume flow of recirculation air into the mixing chamber has reached a predetermined maximum value. The volume flow of recirculation air into the mixing chamber may correspond to the predetermined maximum value, for example, when recirculation fans conveying the recirculation air from the aircraft region to be air conditioned to the mixing chamber are operated with the maximum speed. Alternatively thereto, the predetermined maximum value of the volume flow of recirculation air into the mixing chamber may be a volume flow value that is determined in dependence on the heating demand of the aircraft region to be air conditioned and the actual temperature of the recirculation air. In fact, the volume flow of compressed air into the mixing chamber may be increased from the predetermined minimum value, if the heating demand of the aircraft region to be air conditioned cannot be met by further increasing the volume flow of recirculation air, for example, due to performance restrictions of the recirculation fans or since the actual temperature of the recirculation air is too low.

If a cooling demand of the aircraft region to be air conditioned is determined and the volume flow of compressed air into the mixing chamber exceeds a predetermined minimum value, a volume flow of air cooled by the air conditioning unit of the aircraft air conditioning system into the mixing chamber may be decreased. As a result, the actual temperature of the mixed air in the mixing chamber increases. Therefore, a volume flow of hot compressed air which is supplied to the air cooled by the air conditioning unit is decreased in dependence on the decrease of the volume flow of air cooled by the air conditioning unit. As a result, the increase of the temperature of the mixed air in the mixing chamber caused by the reduction of the volume flow of air cooled by the air conditioning unit can be compensated for. Further, the combined compressed air volume flow formed by the volume flow of air cooled by the air conditioning unit and the volume flow of hot compressed air which is supplied to the air cooled by the air conditioning unit is reduced. Preferably, the volume flow of air cooled by the air conditioning unit into the mixing chamber and the volume flow of compressed air which is supplied to the air cooled by the air conditioning unit are decreased until the air conditioning unit is operated with its maximum cooling capacity, i.e., cools the compressed air to the lowest possible temperature, and a supply of hot compressed air to the air cooled by the air conditioning unit is minimized and, if possible, interrupted.

If the aircraft region to be air conditioned should be cooled, and it is determined that hot compressed air is supplied to the air cooled by the air conditioning unit, although the air conditioning unit is operated with its maximum cooling capacity, the volume flow of recirculation air into the mixing chamber may be increased. Due to the increase of the volume flow of relatively warm recirculating air into the mixing chamber, the supply of hot compressed air to the air cooled by the air conditioning unit may be decreased in dependence on the increase of the volume flow of recirculation air into the mixing chamber. As a result, the combined volume flow of compressed air into the mixing chamber can further be reduced.

An aircraft air conditioning system comprises means for determining a heating or cooling demand of an aircraft region to be air conditioned and a control unit which is adapted to control a volume flow of recirculation air discharged from the aircraft region to be air conditioned and a volume flow of compressed air into a mixing chamber of the aircraft air conditioning system such that the heating or cooling demand of the aircraft region to be air conditioned is met, while the volume flow of compressed air to the mixing chamber of the aircraft air conditioning system is minimized.

If a heating demand of the aircraft region to be air conditioned is determined and a volume flow of compressed air into the mixing chamber exceeds a predetermined minimum value, the control unit may be adapted to increase a volume flow of recirculation air discharged from the aircraft region to be air conditioned into the mixing chamber, and to decrease the volume flow of compressed air into the mixing chamber in dependence of the increase of the volume flow of recirculation air into the mixing chamber. Preferably, this control strategy is implemented until the volume flow of compressed air into the mixing chamber has reached the predetermined minimum value.

Preferably, the volume flow of compressed air into the mixing chamber corresponds to the predetermined minimum value, when an air conditioning unit of the aircraft air conditioning system is operated with its maximum cooling capacity, and a supply of hot compressed air to the air cooled by the air conditioning unit is interrupted.

The control unit may be adapted to stop the increase of the volume flow of recirculation air into the mixing chamber, after the volume flow of compressed air into the mixing chamber has reached the predetermined minimum value, as soon as an actual temperature of the mixed air in the mixing chamber corresponds to a set temperature of the mixed air in the mixing chamber, the set temperature of the mixed air in the mixing chamber being associated with the heating demand of the aircraft region to be air conditioned.

The control unit may further be adapted to increase the volume flow of compressed air into the mixing chamber from the predetermined minimum value, if it is determined that an actual temperature of the mixed air in the mixing chamber is below a set temperature of the mixed air in the mixing chamber, although the volume flow of recirculation air into the mixing chamber has reached a predetermined maximum value.

If a cooling demand of the aircraft region to be air conditioned is determined and a volume flow of compressed air into the mixing chamber exceeds a predetermined minimum value, the control unit may be adapted to decrease a volume flow of air cooled by the air conditioning unit of the aircraft air conditioning system into the mixing chamber, and to decrease a volume flow of hot compressed air which is supplied to the air cooled by the air conditioning unit. Preferably, this control strategy is implemented until the air conditioning unit of the aircraft air conditioning system is operated with its maximum cooling capacity.

The control unit may be adapted to decrease the volume flow of hot compressed air which is supplied to the air cooled by the air conditioning unit by closing a bypass valve provided in a bypass line being connected to a compressed air source and opening into a line connecting the air conditioning unit to the mixing chamber downstream of the air conditioning unit.

The control unit may be adapted to increase the volume flow of recirculation air into the mixing chamber if it is determined that hot compressed air is supplied to the air cooled by the air conditioning unit, although the air conditioning unit of the aircraft air conditioning system is operated with its maximum cooling capacity. The control unit may further be adapted to decrease the volume flow of hot compressed air which is supplied to the air cooled by the air conditioning unit in dependence on the increase of the volume flow of recirculation air into the mixing chamber.

BRIEF DESCRIPTION OF DRAWINGS

A preferred embodiment of the invention in the following will be described in more detail with reference to the appended schematic drawings, in which.

DETAILED DESCRIPTION

Figure 1:
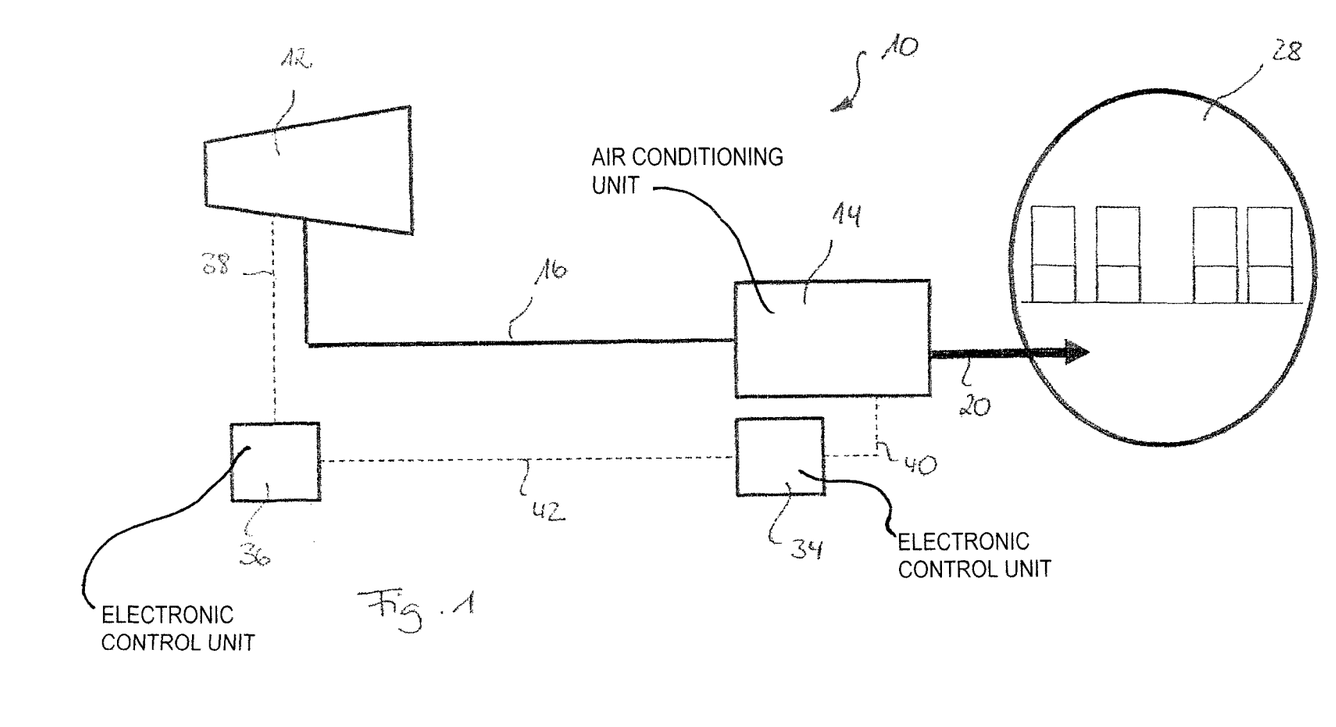
FIG. 1 shows an aircraft air conditioning system which is supplied with compressed fresh air by means of an auxiliary power unit.

FIG. 1 shows an aircraft air conditioning system 10, which, during ground operation of the aircraft, is supplied with compressed process air from an auxiliary power unit 1. The compressed air generated by the auxiliary power unit 12 is supplied to the aircraft air conditioning system 10, specifically an air conditioning unit 14 of the air conditioning 10 via a line 16. As becomes apparent from FIG. 2, a valve 18 is disposed in the line 16 which controls the supply of compressed process air into the air conditioning unit 14 of the aircraft air conditioning system 10. In the air conditioning unit 14 the process air, upon flowing through at least one heat exchanger and upon flowing through various compression and expansion units, is cooled and expanded.

Figure 2:
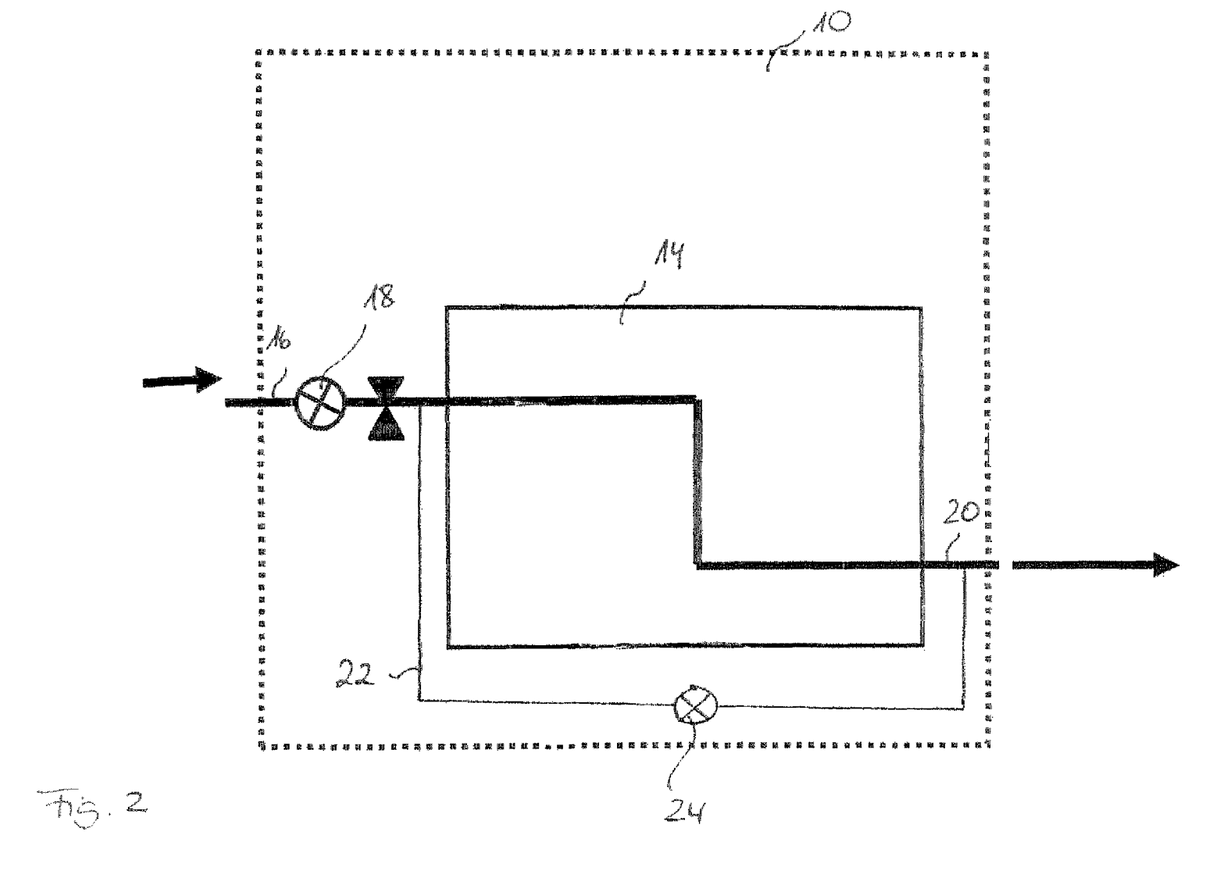
FIG. 2 shows a detail of the aircraft air conditioning system according to FIG. 1.

Cool process air exits the air conditioning unit 14 via a further line 20. A bypass line 22 branches off from the line 16 upstream of the air conditioning unit 14 and opens into the line 20 downstream of the air conditioning unit 14. A bypass valve 24 is disposed in the bypass line 22. Hot process air bled off the auxiliary power unit 12, via the bypass line 22, may bypass the air conditioning unit 14 and may be mixed with the cool air exiting the air conditioning unit 14 downstream of the air conditioning unit 14. Thus, by appropriately controlling the bypass valve 14, the temperature of the process air at the exit of the air conditioning unit 14 may be controlled as desired.

Figure 3:
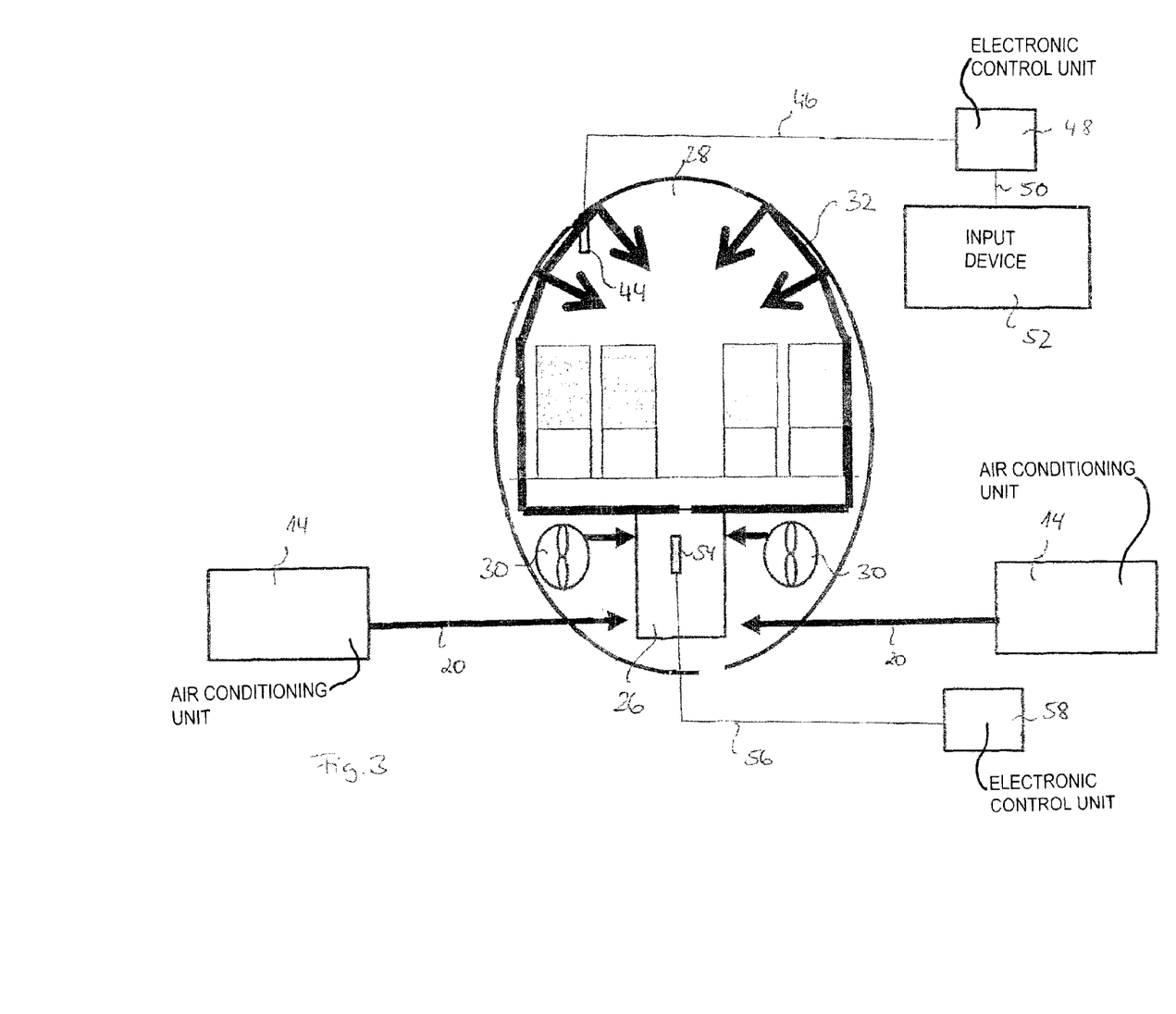
FIG. 3 shows an air distribution system of the aircraft air conditioning system according to FIG. 1.

As depicted in FIG. 3, via the further line 20, compressed air, which may be a mixture of air cooled and expanded by the air conditioning unit 14 and hot compressed air which is supplied to the air cooled in the air conditioning unit 14 via the bypass line 22, is guided into a mixing chamber 26. In the mixing chamber 26 the compressed air is mixed with recirculation air discharged from an aircraft region 28 to be air conditioned by means of recirculation fans 30. Mixed air from the mixing chamber 26 finally is supplied to the aircraft region 28 to be air conditioned via an air distribution system 32.

The operation of the aircraft air conditioning system 10 is controlled by means of an electronic control unit 34. An electronic control unit 36 serves to control the operation of the auxiliary power unit 12. A first signal line 38 connects the control unit 36 for controlling the auxiliary power unit 12 to the auxiliary power unit 12. A second signal line 40 connects the electronic control unit 34 for controlling the air conditioning system 10 to the air conditioning unit 14. Further, the electronic control unit 34 is connected to the recirculation fans 30 and adapted to control the operation of the recirculation fans 30. Moreover, the electronic control unit 34 is connected to the bypass valve 24 and adapted to control the operation of the bypass valve 24. Finally, the control units 34, 36 communicate with each other via a third signal line 42.

Figure 4:
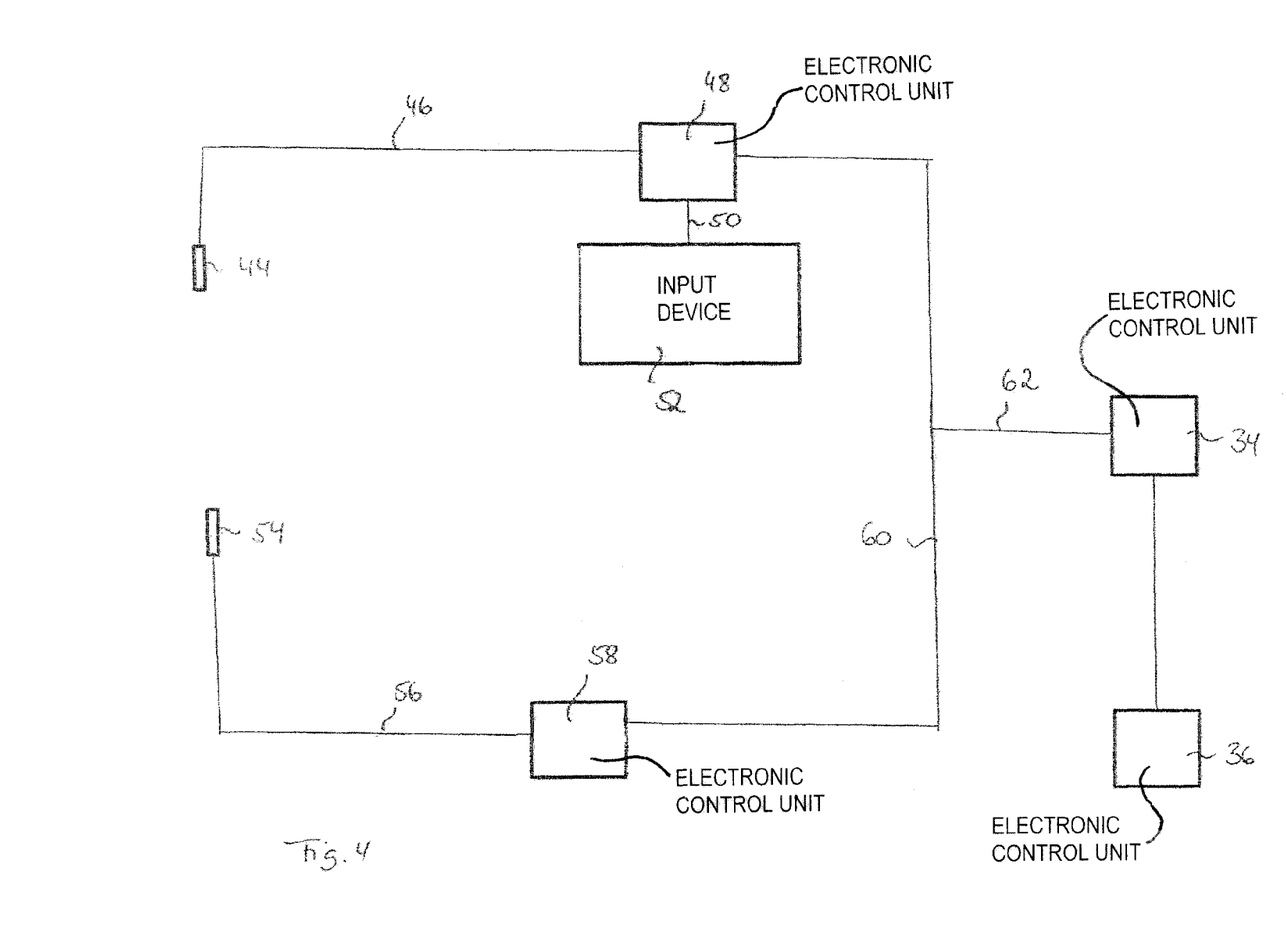
FIG. 4 shows a diagram depicting the control of the aircraft air conditioning system according to FIG. 1.

As becomes apparent from FIGS. 3 and 4, a temperature sensor 44 is disposed in the aircraft region 28 to be air conditioned, which, via a fourth signal line 46, provides signals indicative of the actual temperature in the aircraft region 28 to be air conditioned to an electronic control unit 48. The electronic control unit 48, via a fifth signal line 50, is connected to an input device 52. Upon start-up of the aircraft air conditioning system 10 the electronic control unit 48 determines a heating or cooling demand of the aircraft region 28 to be air conditioned. For determining the heating or cooling demand of the aircraft region 28 to be air conditioned, the electronic control unit 48 may, for example, compare an actual temperature in the aircraft region 28 to be air conditioned with a set temperature in the aircraft region 28 to be air conditioned. The actual temperature in the aircraft region 28 to be air conditioned may be measured by means of the temperature sensor 44 which is disposed in the aircraft region 28 to be air conditioned. The set temperature in the aircraft region 28 to be air conditioned may, for example, be input by a user via the input device 52 or may be stored in a storage device of the electronic control unit 48.

A further temperature sensor 54 is disposed in the mixing chamber 26 of the air conditioning system 10. A sixth signal line 46 connects the temperature sensor to an electronic control unit 58. Based the heating or cooling demand of the aircraft region 28 to be air conditioned, which is communicated to the electronic control unit 58 via a seventh signal line 60, the electronic control unit 58 determines a set temperature of the mixed air in the mixing chamber 26. Further, the electronic control unit 58 compares the set temperature of the mixed air in the mixing chamber 26 with the actual temperature of the mixed air in the mixing chamber 26 which is measured by means of the temperature sensor 54.

The electronic control unit 48 and the electronic control 58 both, via an eighth signal line 62, communicate with the electronic control unit 34 of the air conditioning system 10. Based on the data provided by the electronic control units 48, 58, the electronic control unit 34 controls the operation of the air conditioning unit 14 and thus the temperature and the volume flow of cool air exiting the air conditioning unit 14. Further, the electronic control unit 34 controls the bypass valve 24 and thus the supply of hot compressed air to the cool air exiting the air conditioning unit 14. Finally, the electronic control unit 34 controls the operation of the recirculation fans 30 and thus the volume flow of recirculation air conveyed by the recirculation fans 30 from the aircraft region 28 to be air conditioned into the mixing chamber 26. The electronic control unit 34, via the third signal line 42, communicates with the electronic control unit 36 of the auxiliary power unit 12 which controls the operation of the auxiliary power unit 12 in dependence on the data provided by the electronic control unit 34 of the air conditioning system 10.

It should be noted that the above described distribution of control tasks to different electronic control units is merely an example of how the air conditioning system 10 and the auxiliary power unit 12 may be controlled. It is, of course, also conceivable to use a smaller number of control units or only one control unit for implementing the control strategies which will be described in more detail in the following. Further, instead of signal lines, wireless data transmission may be employed.

During operation of the aircraft air conditioning system 10, the electronic control unit 34 of the air conditioning system 10 controls the volume flow of recirculation air discharged from the aircraft region 28 to be air conditioned and the volume flow of compressed air, i.e., a combined volume flow of cool air exiting the air conditioning unit 14 and hot compressed air supplied to the cool air exiting the air conditioning unit 14 via the bypass line 22, into the mixing chamber 26 such that the heating or cooling demand of the aircraft region 28 to be air conditioned is met, while the volume flow of compressed air into the mixing chamber 26 is minimized. Minimizing the volume flow of compressed air into the mixing chamber 26 allows a particularly energy efficient operation of the auxiliary power unit 12. Specifically, fuel consumption and wear of the auxiliary power unit 12 can be reduced.

Figure 5:
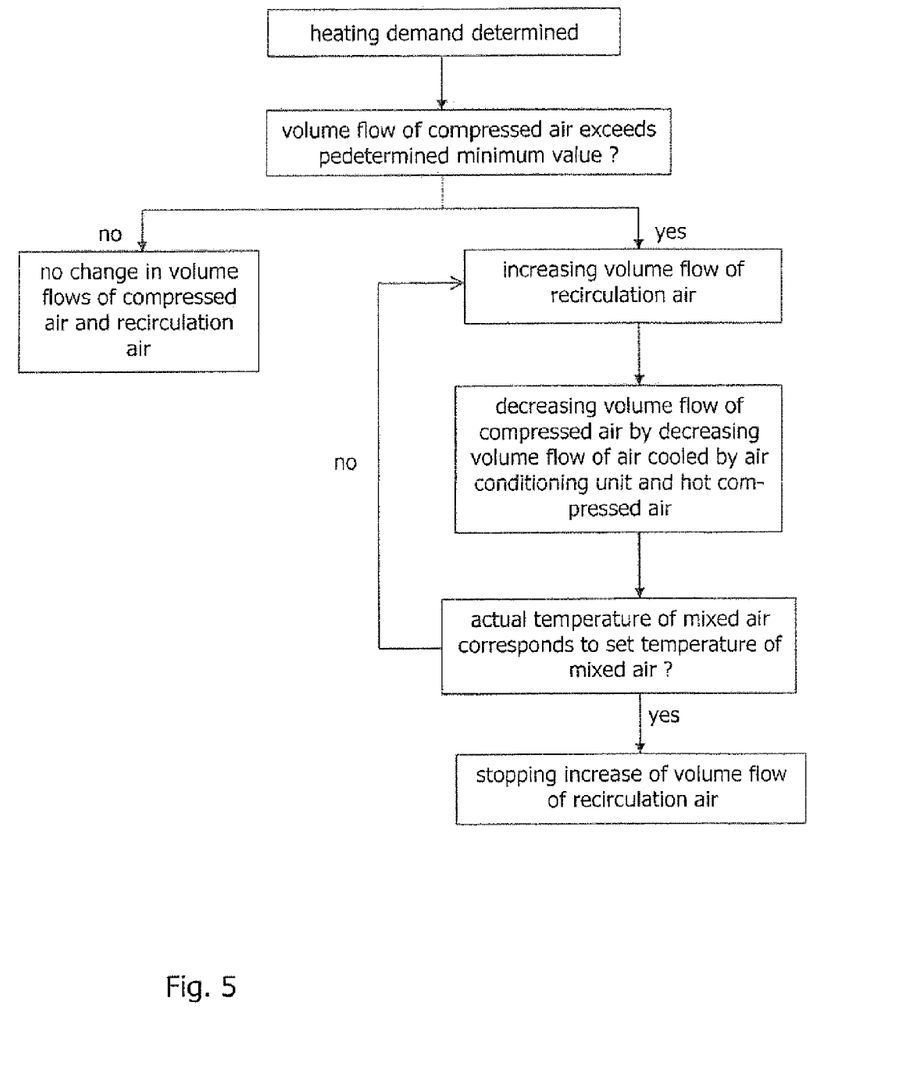
FIG. 5 shows a flow diagram of a method for operating the aircraft air conditioning system according to FIG. 1 in a heating mode.

FIG. 5 shows a flow diagram of a method for operating the aircraft air conditioning system 10 in a heating mode, i.e., in a case wherein the electronic control unit 48, for the aircraft region 28 to be air conditioned, has determined a heating demand. In a first step, the electronic control unit 34 analyses, whether the volume flow of compressed air into the mixing chamber 26 of the air conditioning system 10 exceeds a predetermined minimum value. The volume flow of compressed air into the mixing chamber 26 corresponds to the predetermined minimum value, when the air conditioning unit 14 is operated with its maximum cooling capacity, i.e., cools the compressed air to the lowest possible temperature, and the supply of hot compressed air to the air cooled by the air conditioning unit 14 is interrupted, i.e., the bypass valve 24 disposed in the bypass line 22 is closed. If the volume flow of compressed air into the mixing chamber 26 corresponds to the predetermined minimum value, the control strategy simply is maintained, i.e., no changes in the volume flows of compressed air and recirculation air into the mixing chamber 26 are initiated.

If, however, the volume flow of compressed air into the mixing chamber 26 exceeds the predetermined minimum value, the volume flow of recirculation air discharged from the aircraft region 28 to be air conditioned into the mixing chamber 26 is increased by increasing the speed of the recirculation fans 30. By increasing the volume flow of typically relatively warm recirculation air into the mixing chamber 26, the actual temperature of the mixed air in the mixing chamber 26 is increased so as to approach the set temperature.

In the next step, the volume flow of compressed air into the mixing chamber 26 is decreased in dependence on the increase of the volume flow of recirculation air into the mixing chamber 26. Typically, the decrease of the volume flow of compressed air into the mixing chamber 26 is adjusted to the increase of the volume flow of recirculation air into the mixing chamber 26 such that a combined volume flow of recirculation air and compressed air is kept constant.

Upon decreasing the volume flow of compressed air into the mixing chamber 26 it is possible to first decrease the volume flow of air cooled by the air conditioning unit 14 and to then decrease the supply of hot compressed air to the air cooled by the air conditioning unit 14 in dependence on the decrease of the volume flow of air cooled by the air conditioning unit 14. It is, however, also conceivable to implement a decrease of the volume flow of compressed air into the mixing chamber 26 by first decreasing the supply of hot compressed air to the air cooled by the air conditioning unit 14 and by then decreasing the volume flow of air cooled by the air conditioning unit 14 in dependence on the decrease of the supply of hot compressed air to the air cooled by the air conditioning unit 14. The supply of hot compressed air to the air cooled by the air conditioning unit 14 is be decreased and, if possible, finally interrupted by closing the bypass valve 24.

When the volume flow of compressed air into the mixing chamber 26 has reached the predetermined minimum value, the increase of the volume flow of recirculation air into the mixing chamber 26 is stopped, as soon as an actual temperature of the mixed air in the mixing chamber 26 corresponds to the set temperature of the mixed air in the mixing chamber 26 which is determined by the control unit 58 based on the heating demand of the aircraft region 28 to be air conditioned.

During the entire control procedure it is possible to increase the volume flow of compressed air into the mixing chamber 26 from the predetermined minimum value or any other value, if it is determined that the actual temperature of the mixed air in the mixing chamber 26 is below the set temperature of the mixed air in the mixing chamber 26, although the volume flow of recirculation air into the mixing chamber 26 has reached a predetermined maximum value, i.e., the recirculation fans 30 are operated with the maximum speed. Further, the predetermined maximum value of the volume flow of recirculation air into the mixing chamber is determined in dependence on the heating demand of the aircraft region 28 to be air conditioned and the actual temperature of the recirculation air which typically corresponds to the actual temperature in the aircraft region 28 to be air conditioned and which may be measured by means of the temperature sensor 44. Thus, the volume flow of compressed air into the mixing chamber 26 is increased, if the heating demand of the aircraft region 28 to be air conditioned cannot be met by further increasing the volume flow of recirculation air, for example, due to performance restrictions of the recirculation fans 30 or since the actual temperature of the recirculation air is too low.

Figure 6:
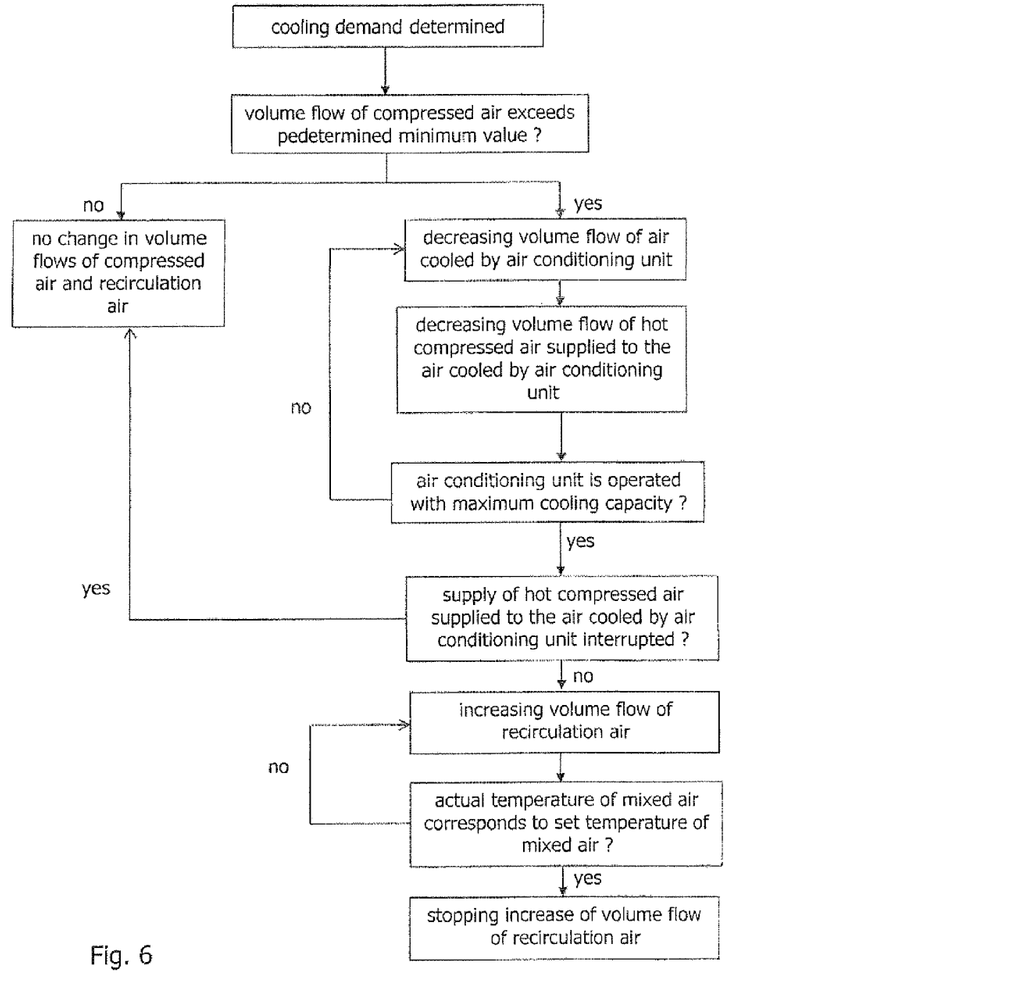
FIG. 6 shows a flow diagram of a method for operating the aircraft air conditioning system according to FIG. 1 in a cooling mode.

FIG. 6 shows a flow diagram of a method for operating the air conditioning system 10 in a cooling mode, i.e., a method for operating the aircraft air conditioning system 10 in case a cooling demand of the aircraft region 28 to be air conditioned is determined by the electronic control unit 48. In case a cooling demand of the aircraft region 28 to be air conditioned is determined, the control unit 34, in a first step, again analyses whether the volume flow of compressed air into the mixing chamber 26 exceeds the predetermined minimum value or not. If the volume flow of compressed air into the mixing chamber 26 corresponds to the predetermined minimum value, i.e., the air conditioning unit 14 is operated with its maximum cooling capacity and the bypass valve 24 disposed in the bypass line 22 is closed, the control strategy is not changed, i.e., the volume flows of compressed air and recirculation air into the mixing chamber 26 are kept constant.

If, however, the electronic control unit 34 determines, that the volume flow of compressed air into the mixing chamber 26 exceeds the predetermined minimum value, the volume flow of air cooled by the air conditioning unit 14 of the aircraft air conditioning system 10 into the mixing chamber 26 is decreased. As a result, the actual temperature of the mixed air in the mixing chamber 26 increases. Therefore, the volume flow of hot compressed air which is supplied to the air cooled by the air conditioning unit 14 is decreased in dependence on the decrease of the volume flow of air cooled by the air conditioning unit 14 by closing the bypass valve 24. As a result, the increase of the temperature of the mixed air in the mixing chamber 26 caused by the reduction of the volume flow of air cooled by the air conditioning unit 14 is compensated for.

If possible, the volume flow of air cooled by the air conditioning unit 14 into the mixing chamber 26 and the volume flow of compressed air which is supplied to the air cooled by the air conditioning unit 14 are decreased until the air conditioning unit 14 is operated with its maximum cooling capacity, i.e., cools the compressed air to the lowest possible temperature, and the supply of hot compressed air to the air cooled by the air conditioning unit 14 is minimized and, if possible, interrupted by closing the bypass valve 24.

If it is determined by the control unit 34 that hot compressed air is supplied to the air cooled by the air conditioning unit 14, although the air conditioning unit 14 is operated with its maximum cooling capacity, the volume flow of recirculation air into the mixing chamber 26 is increased. Due to the increase of the volume flow of relatively warm recirculating air into the mixing chamber 26, it is possible to decrease the supply of hot compressed air to the air cooled by the air conditioning unit 14 in dependence on the increase of the volume flow of recirculation air into the mixing chamber 26. As a result, the combined volume flow of compressed air into the mixing chamber 26 can further be reduced. The increase of the volume flow of recirculation air into the mixing chamber 26 is stopped, as soon as an actual temperature of the mixed air in the mixing chamber 26 corresponds to the set temperature of the mixed air in the mixing chamber 26 which is determined by the control unit 58 based on the heating demand of the aircraft region 28 to be air conditioned.

The invention claimed is:

1. A method for controlling an aircraft air conditioning system, the method comprising the steps:

determining a heating or cooling demand of an aircraft region to be air conditioned, and controlling a volume flow of recirculation air discharged from the aircraft region to be air conditioned and a volume flow of compressed air into a mixing chamber of the aircraft air conditioning system such that the heating or cooling demand of the aircraft region to be air conditioned is met, while the volume flow of compressed air into the mixing chamber of the aircraft air conditioning system is reduced, wherein the volume flow of compressed air into the mixing chamber corresponds to a predetermined minimum value, when an air conditioning unit of the aircraft air conditioning system is operated with maximum efficiency to reduce the temperature of the compressed air at an exit region of the air conditioning unit and when a supply of hot compressed air to the air cooled by the air conditioning unit is interrupted, and wherein the method further comprises, in the event that a heating demand of the aircraft region to be air conditioned is determined and the volume flow of compressed air into the mixing chamber exceeds the predetermined minimum value:

increasing the volume flow of recirculation air discharged from the aircraft region to be air conditioned into the mixing chamber, decreasing the volume flow of compressed air into the mixing chamber in dependence on the increase of the volume flow of recirculation air into the mixing chamber until the volume flow of compressed air into the mixing chamber has reached the predetermined minimum value, and stopping the increase of the volume flow of recirculation air into the mixing chamber, after the volume flow of compressed air into the mixing chamber has reached the predetermined minimum value, as soon as an actual temperature of the mixed air in the mixing chamber corresponds to a set temperature of the mixed air in the mixing chamber, the set temperature of the mixed air in the mixing chamber being associated with the heating demand of the aircraft region to be air conditioned.

2. The method according to claim 1,
wherein the volume flow of compressed air into the mixing chamber is increased from the predetermined minimum value, if it is determined that an actual temperature of the mixed air in the mixing chamber is below a set temperature of the mixed air in the mixing chamber, although the volume flow of recirculation air into the mixing chamber has reached a predetermined maximum value.

3. The method according to claim 1,
wherein, if a cooling demand of the aircraft region to be air conditioned is determined and the volume flow of compressed air into the mixing chamber exceeds a predetermined minimum value,
a volume flow of air cooled by the air conditioning unit of the aircraft air conditioning system into the mixing chamber is decreased, and
a volume flow of hot compressed air which is supplied to the air cooled by the air conditioning unit is decreased in dependence on the decrease of the volume flow of air cooled by the air conditioning unit until the air conditioning unit of the aircraft air conditioning system is operated at a maximum cooling level.

4. The method according to claim 3,
wherein the volume flow of recirculation air into the mixing chamber is increased, if hot compressed air is supplied to the air cooled by the air conditioning unit, while the air conditioning unit of the aircraft air conditioning system is operated with its maximum cooling capacity, and wherein the volume flow of hot compressed air which is supplied to the air cooled by the air conditioning unit is decreased in dependence on the increase of the volume flow of recirculation air into the mixing chamber.

5. An aircraft air conditioning system comprising:
a temperature sensor for determining a heating or cooling demand of an aircraft region to be air conditioned, and
a controller configured to control a volume flow of recirculation air discharged from the aircraft region to be air conditioned and a volume flow of compressed air into a mixing chamber of the aircraft air conditioning system such that the heating or cooling demand of the aircraft region to be air conditioned is met, while the volume flow of compressed air into the mixing chamber of the aircraft air conditioning system is reduced,
wherein the volume flow of compressed air into the mixing chamber corresponds to a predetermined minimum value, when an air conditioning unit of the aircraft air conditioning system is operated with maximum efficiency to reduce the temperature of the compressed air at an exit region of the air conditioning unit and when a supply of hot compressed air to the air cooled by the air conditioning unit is interrupted, and
wherein, in the event that a heating demand of the aircraft region to be air conditioned is determined and a volume flow of compressed air into the mixing chamber exceeds the predetermined minimum value, the controller is configured to:
increase a volume flow of recirculation air discharged from the aircraft region to be air conditioned into the mixing chamber,
decrease the volume flow of compressed air into the mixing chamber in dependence on the increase of the volume flow of recirculation air into the mixing chamber until the volume flow of compressed air into the mixing chamber has reached the predetermined minimum value, and
stop the increase of the volume flow of recirculation air into the mixing chamber, after the volume flow of compressed air into the mixing chamber has reached the predetermined minimum value, as soon as an actual temperature of the mixed air in the mixing chamber corresponds to a set temperature of the mixed air in the mixing chamber, the set temperature of the mixed air in the mixing chamber being associated with the heating demand of the aircraft region to be air conditioned.

6. The system according to claim 5,
wherein the controller is configured to increase the volume flow of compressed air into the mixing chamber from the predetermined minimum value, if it is determined that an actual temperature of the mixed air in the mixing chamber is below a set temperature of the mixed air in the mixing chamber, although the volume flow of recirculation air into the mixing chamber has reached a predetermined maximum value.

7. The system according to claim 5,
wherein, if a cooling demand of the aircraft region to be air conditioned is determined and a volume flow of compressed air into the mixing chamber exceeds a predetermined minimum value, the controller is configured to:
decrease a volume flow of air cooled by the air conditioning unit of the aircraft air conditioning system into the mixing chamber, and
decrease a volume flow of hot compressed air which is supplied to the air cooled by the air conditioning unit until the air conditioning unit of the aircraft air conditioning system is operated at a maximum cooling level.

8. The system according to claim 7,
wherein the controller is configured to decrease the volume flow of hot compressed air which is supplied to the air cooled by the air conditioning unit by closing a bypass valve provided in a bypass line being connected to a compressed air source and opening into a line connecting the air conditioning unit to the mixing chamber downstream of the air conditioning unit.

9. The system according to claim 7,
wherein the controller is configured to increase the volume flow of recirculation air into the mixing chamber, if hot compressed air is supplied to the air cooled by the air conditioning unit, while the air conditioning unit of the aircraft air conditioning system is operated with its maximum cooling capacity, and to decrease the volume flow of hot compressed air which is supplied to the air cooled by the air conditioning unit in dependence on the increase of the volume flow of recirculation air into the mixing chamber.

\* \* \* \* \*